United States Patent
Bock et al.

(10) Patent No.: US 7,032,778 B2
(45) Date of Patent: Apr. 25, 2006

(54) OVERPRESSURE LIMITING HYBRID INFLATOR

(75) Inventors: Christopher J. Bock, Phoenix, AZ (US); Jim Eskildsen, Tempe, AZ (US)

(73) Assignee: Goodrich Corporation, Charlotte, NC (US)

(*) Notice: Subject to any disclaimer, the term of this patent is extended or adjusted under 35 U.S.C. 154(b) by 612 days.

(21) Appl. No.: 10/354,389

(22) Filed: Jan. 30, 2003

(65) Prior Publication Data

US 2004/0151600 A1 Aug. 5, 2004

(51) Int. Cl.
*B67D 5/00* (2006.01)

(52) U.S. Cl. .................. 222/3; 222/5; 222/1; 280/736; 280/737; 280/741; 137/68.13

(58) Field of Classification Search .................. 222/1, 222/3, 5; 280/735–742; 137/68.13, 71, 137/68.14, 68.19, 68.23; 102/266, 268, 530–531, 102/276
See application file for complete search history.

(56) References Cited

U.S. PATENT DOCUMENTS

| | | | |
|---|---|---|---|
| 3,786,843 A * | 1/1974 | Stephenson et al. | 141/13 |
| 4,050,483 A * | 9/1977 | Bishop | 141/4 |
| 4,368,009 A | 1/1983 | Heimovics, Jr. et al. | |
| 5,350,192 A * | 9/1994 | Blumenthal | 280/737 |
| 5,423,570 A * | 6/1995 | Kort et al. | 280/736 |
| 5,468,015 A * | 11/1995 | Goetz | 280/737 |
| 5,630,618 A | 5/1997 | Hamilton et al. | |
| 5,664,802 A | 9/1997 | Harris et al. | |
| 5,738,371 A | 4/1998 | Blackshire et al. | |
| 5,794,973 A * | 8/1998 | O'Loughlin et al. | 280/737 |
| 5,820,162 A * | 10/1998 | Fink | 280/742 |
| 5,988,438 A | 11/1999 | Lewis et al. | |
| 6,106,008 A | 8/2000 | Blackshire et al. | |
| 6,860,205 B1 * | 3/2005 | Baker et al. | 244/129.1 |
| 6,877,698 B1 * | 4/2005 | Baker et al. | 182/48 |

* cited by examiner

*Primary Examiner*—Frederick C. Nicolas
(74) *Attorney, Agent, or Firm*—Jerry Holden; John Titus

(57) ABSTRACT

A dual stage hybrid inflation device includes a first stage gas source having a pressurized gas stored in a first stage pressure vessel and a second stage gas source having a pyrotechnic gas generator having a gas output directed into the first stage pressure vessel. The first stage pressure vessel is in fluid communication with an inflatable device such as an aircraft emergency evacuation slide via an externally actuated valve upstream of a pressure actuated valve such as a rupturable diaphragm. A control circuit provides a signal to the externally actuated valve to begin a flow of gases from first stage pressure vessel to a chamber on the upstream side of the burst diaphragm. The control circuit also sends a signal to the squib that initiates the pyrotechnic second stage gas source. As the pyrotechnic gas generator of the second stage gas source burns, the hot gaseous products of the second stage gas source mix with the pressurized gas stored in the first stage pressure vessel a predetermined time after the externally actuated valve opens.

17 Claims, 2 Drawing Sheets

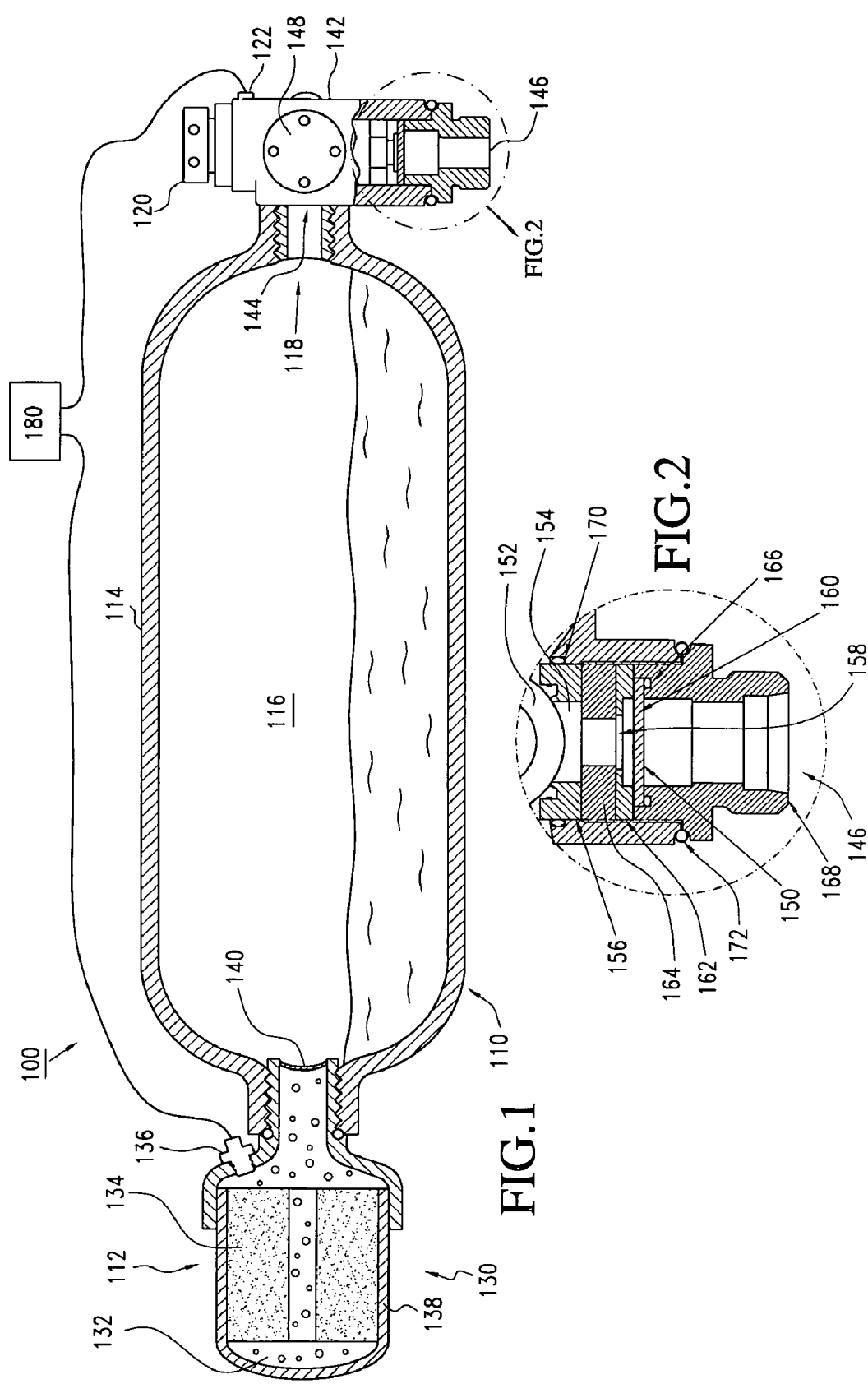

OVERPRESSURE LIMITING HYBRID INFLATOR

BACKGROUND OF THE INVENTION

This invention relates to emergency evacuation equipment for aircraft. In particular, this invention relates to an inflation device for inflating an inflatable aircraft evacuation slide or other inflatable device.

The requirement for reliably evacuating airline passengers in the event of an emergency is well known. Emergencies at take-off and landing often demand swift removal of the passengers and crew from the aircraft because of the potential for injuries from fire, explosion, or sinking in water. A conventional method of quickly evacuating a large number of persons from an aircraft is to provide multiple emergency exits, each of which is equipped with an inflatable evacuation slide. Current state-of-the-art emergency evacuation slide systems comprise an inflatable evacuation slide which is stored in an uninflated folded state together with a source of inflation gas. The source of inflation gas typically comprises a gas generator, stored compressed gas, or a combination thereof. Pyrotechnic gas generators have an advantage in that they are small, lightweight, and produce a high volume of gas, however, the high temperature gas produced by a gas generator alone can cause numerous problems including sagging of the evacuation slide as the inflation gas cools and, in some cases, melting of the fabric out of which the inflation slide is fabricated. Use of stored compressed gas by itself, although simple, engenders a weight penalty that must be paid for carrying a pressure vessel having sufficient capacity (in terms of volume and pressure) to inflate the evacuation slide over the wide operational temperature range specified for such slides. Additionally, where only a compressed gas is used to inflate the evacuation slide, as the gases expand out of the pressure vessel a large drop in temperature occurs, which in some cases may cause ice to form blocking the flow of gas. Accordingly, state-of-the-art emergency evacuation slide systems typically comprise a hybrid inflator, which utilizes a stored compressed gas together with a pyrotechnic gas generator. The pyrotechnic gas generator augments the stored compressed gas by providing additional gas as well as heat to counteract the effects of the expansion-induced cooling of the compressed gas as it expands out of the pressure vessel.

To further augment the volume of gas delivered to the evacuation slide, many evacuation systems utilize aspirators such as that disclosed in U.S. Pat. No. 4,368,009 to Heimovics, et al. As the compressed gas flows through the aspirator, a venturi is produced that causes the aspirator to pump about two to three times as much gas as is supplied by the compressed gas source alone.

Despite these advances, there still exist problems due to the wide ambient temperature range over which these inflation systems are required to operate, typically from −65° F. to +160° F. The amount of gas available must be enough to pressurize the evacuation slide at the coldest temperature. However, because of the relationship between pressure and temperature within a fixed volume, as the ambient temperature rises above the minimum, the pressure within the pressure vessel rises proportionately. Accordingly, in current state-of-the-art hybrid inflation systems, the storage vessel must, at a minimum, be capable of withstanding the pressure of the compressed gas at 160° F. Not only this, but the storage vessel must withstand the overpressure at 160° F. caused by the pyrotechnic gas generator being initiated a time when the pressure within the storage vessel is already at a peak due to the high ambient temperature.

Accordingly, what is needed is a hybrid compressed gas/pyrotechnic inflation device that prevents overpressurization of the pressure vessel at high temperatures, while providing sufficient inflation pressure at low temperatures.

SUMMARY OF THE INVENTION

The present invention comprises a dual stage hybrid inflation device including a first stage gas source comprising a pressurized gas stored in a first stage pressure vessel and a second stage gas source comprising a pyrotechnic gas generator having a gas output directed into the first stage pressure vessel. According to an embodiment of the present invention, the first stage pressure vessel is in fluid communication with an inflatable device such as an aircraft emergency evacuation slide via an externally actuated valve, such as an electrically actuated ball valve, upstream of a pressure actuated valve such as a rupturable diaphragm. A control circuit provides a signal to the externally actuated valve to begin a flow of gases from first stage pressure vessel to a chamber on the upstream side of the burst diaphragm. According to the illustrative embodiment, after a predetermined time delay, the control circuit sends a signal to the squib that initiates the pyrotechnic second stage gas source. As the pyrotechnic gas generator of the second stage gas source burns, the hot gaseous products of the second stage gas source mix with the pressurized gas stored in the first stage pressure vessel.

At low temperatures, the pressure actuated valve prevents the flow of gas from the first stage pressure vessel into the inflatable device notwithstanding the opening of the externally actuated valve. This allows the hot combustion products from the second stage gas source to mix with the pressurized gas in the first stage pressure vessel, thereby heating the pressurized gas until sufficient pressure is developed in the first stage pressure vessel to open the pressure actuated valve. At high temperatures, however, pressure in the first stage pressure vessel is above the threshold pressure of the pressure actuated valve. Accordingly, when the externally actuated valve is opened, the pressure actuated valve opens immediately, thereby allowing the pressure in the first stage pressure vessel to drop to a safe level before the pyrotechnic gas generator is initiated. By allowing the first stage pressure vessel to partially depressurize prior to initiation of the pyrotechnic gas generator, the peak pressure produced by the pyrotechnic gas generator in the first stage pressure vessel is reduced. By depressurizing the first stage pressure vessel in advance of initiation of the second gas source at high temperature, the appropriate augmentation of the compressed first stage gas can be realized without the necessity of designing the first stage pressure vessel to withstand initiation of the pyrotechnic gas generator under maximum inflation pressure conditions. This enables the first stage pressure vessel to be of a lighter weight construction reducing the cost of the system and improving fuel economy of the aircraft on which such systems are installed.

BRIEF DESCRIPTION OF THE DRAWING

The present invention will be better understood from a reading of the following detailed description taken in conjunction with the accompanying drawing figures in which like references designate like elements and, in which:

FIG. 1 is a partially schematic sectional view of an inflator incorporating features of the present invention;

FIG. 2 is an enlarged partial cross section view of the inflator of FIG. 1; and

DETAILED DESCRIPTION

Figure 3:
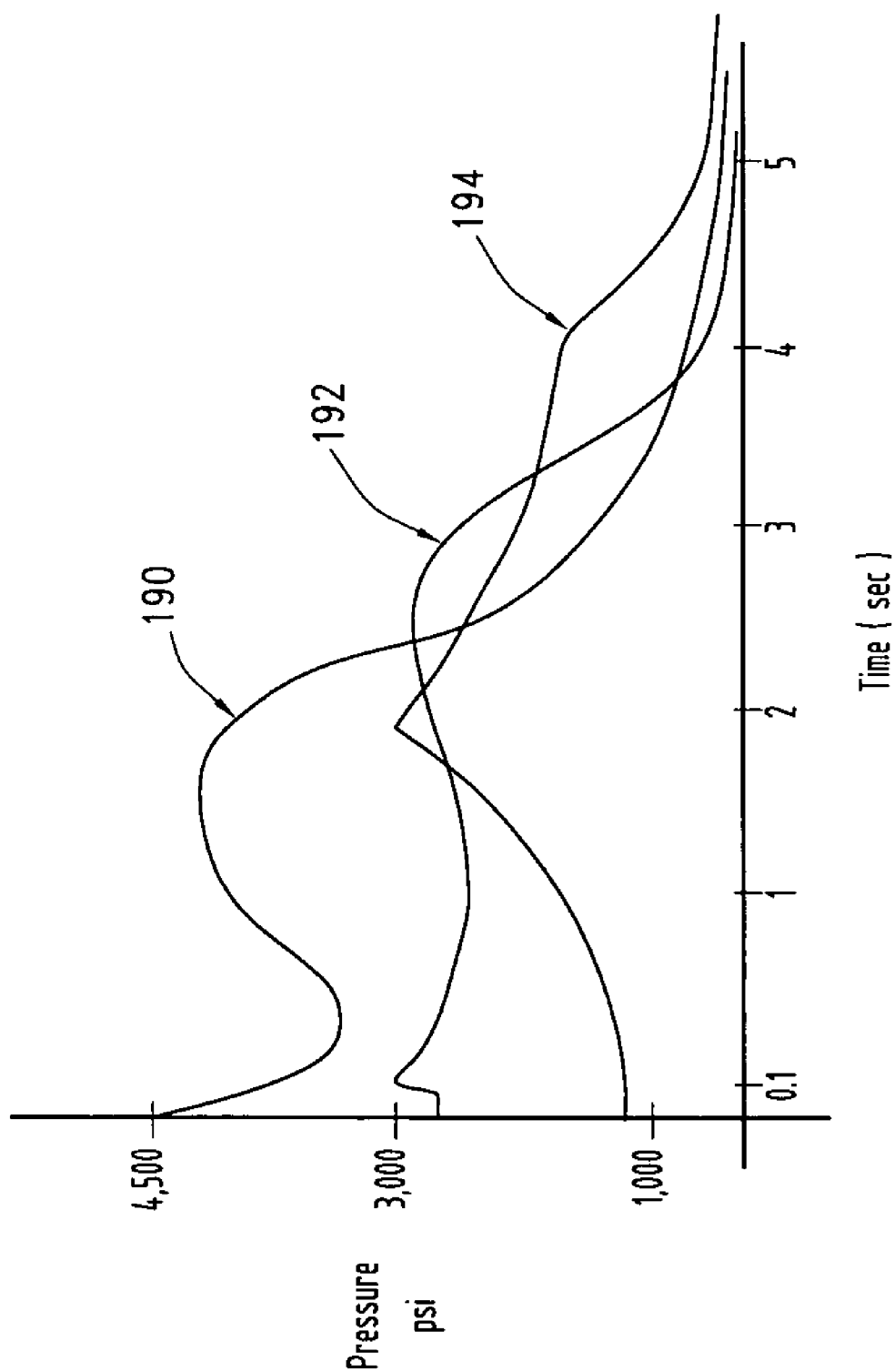
FIG. 3 is a graphical representation of pressure versus temperature curves of an inflator incorporating features of the present invention.

The drawing figures are intended to illustrate the general manner of construction and are not necessary to scale. In the detailed description and in the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

The present invention is directed to a method and apparatus for inflating an inflatable device such as an aircraft emergency evacuation slide over a wide range of operating temperatures. An inflator incorporating features the present invention is shown in FIG. 1. Inflator 100 comprises a first stage gas source 110 and a second stage gas source 112. First stage gas source 110 comprises a pressure vessel 114 containing a mixture of compressed inflation gases 116. In the illustrative example of FIG. 1, inflation gas mixture 116 comprises approximately a 2:1 ratio of carbon dioxide to nitrogen. In general, however, the mixture of inflation gases, as well as the ratio of gases, can vary based on the particular application. Because carbon dioxide liquifies at ambient temperatures at a relatively modest pressure, depending on the ambient temperature, some or all of the carbon dioxide component of inflation gas mixture 116 will be in a liquid state. Accordingly, as used herein the term compressed gas means and refers to gas that is in a gaseous state under pressure as well as gas that has changed phase to a liquid state under pressure. Pressure vessel 114 has a gas exit opening 118 to which is attached to a control valve 120. Control valve 120 is normally closed but is externally actuated via an input terminal 122 which is adapted to receive a voltage signal that opens control valve 120 to permit gases to flow from pressure vessel 114 as hereinafter described is detail.

Although a nitrogen/carbon dioxide mixture is disclosed in the embodiment of FIG. 1, any of the pressurized inflation gases well known in the art may be used for inflation gas mixture 116. For example, gases that may be utilized in accordance with the present invention either alone or in combination include, but are not limited to carbon dioxide, nitrogen, chlorofluorocarbons, bromofluorocarbons, nitrous oxide and argon. The combination of carbon dioxide and nitrogen is preferred, however, because of the ability of carbon dioxide to liquify, and thus require a minimum of storage volume and the inert nature of nitrogen even at high pressure and temperature.

Second stage gas source 112 comprises a pyrotechnic gas generator 130 either alone or in combination with a compressed gas 132 (such as disclosed in U.S. Pat. No. 5,988, 438 to Lewis, et al. and assigned to the Assignee of the present invention). Pyrotechnic gas generator 130 comprises a pyrotechnic material 134 which may either be in stick form or pressed into a housing 138. Second stage gas source 112 is isolated from first stage gas source 110 by a second stage burst disk 140. Pyrotechnic material 134 is initiated by a conventional bridge wire initiator 136 or other conventional initiator. Pyrotechnic material 134 may be any pyrotechnic gas generator material such as sodium-azide, or lithium-azide coupled with an oxidizer such as sodium nitrate, potassium nitrate, potassium perchlorate and the like but preferably comprises ammonium nitrate in combination with a secondary explosive such as cyclotrimethylene trinitramine (RDX); cyclotetramethylene tetranitramine (HMX); pentaerythritol tetranitrate (PETN), hexanitrohexaazaisowurtzitane (CL20) or similar energizers that produce a high volume of gaseous combustion products with little or no particulates. A most preferred gas generator material is UPCO 8043, a slow burning, relatively insensitive ammonium nitrate base propellant available from Universal Propulsion Company, Inc. of Phoenix, Ariz.

With referenced to FIGS. 1 and 2, control valve 120 comprises a housing 142 having an input port 144 and an output port 146. Input port 144 is in fluid communication with gas exit opening 118 of pressure vessel 114 and output port 146 is in fluid communication with the inflatable device to be inflated by inflator 100. Control valve 120 comprises an externally actuated valve assembly 148 and a pressure actuated valve 150. Externally actuated valve assembly 148 may comprise any conventional externally actuated valve such as lanyard actuated valve, explosively ruptured diaphragm valve, or other electrically actuated valve. In the embodiment of FIGS. 1 and 2, externally actuated value assembly 148 comprises an electro-explosively driven ball valve 152, which is rotated from a closed position to an open position by an electro-explosive piston actuator operating a rack and pinion to rotate the ball of ball valve 152, but may also be pneumatically actuated by a solenoid valve that vents the stored gas into a pneumatic cylinder to operate the rack. With ball valve 152 rotated to the open position, gas pressure in pressure vessel 114 is communicated to a first plenum 154 formed in ball seat 156. Pressure in first plenum 154 is communicated to a second plenum 158 acting on pressure actuated valve 150. Pressure actuated valve 150 may be a conventional spring-loaded pressure relief valve or other conventional pressure actuated valve, however in the embodiment of FIGS. 1 and 2 pressure actuated valve 150 comprises a burst diaphragm 160 having a predetermined burst pressure. In the embodiment in FIG. 2, burst diaphragm 160 is sealed against a spacer 162 abutting a flow restricter 164 by means of a face seal 166 compressed against nipple 168 which is threaded into housing 142. In the embodiment of FIGS. 1 and 2 Face seal 166 as well as additional seals 170 and 172 comprise conventional O-ring seals.

With reference now to FIG. 3, in operation, upon an initiation event, such as the opening of an aircraft emergency exit door in the "armed" position, a controller 180, which comprises a conventional electric timing circuit, microcontroller or other electric control device, sends a trigger signal to input terminal 122 of control valve 120. The trigger signal causes externally actuated valve assembly 148 of control valve 120 to open allowing gas to flow into plenum 154 and plenum 158 of control valve 120. At a predetermined pressure, burst diaphragm 160 of control valve 120 will rupture allowing inflation gases 116 to begin to flow into the inflatable device. Controller 180 also transmits a trigger signal to initiator 136 of second stage gas source 112. In response to the trigger signal, initiator 136 initiates the pyrotechnic material 134 of pyrotechnic gas generator 130. Upon initiation of pyrotechnic material 134, pressure within gas generator 130 increases until at a predetermined pressure, second stage burst disk 140 ruptures thereby allowing the heated gaseous output of pyrotechnic gas generator 130 to mix with the inflation gases 116 in pressure vessel 114.

In the illustrative embodiment, the trigger signal to initiator 136 is transmitted a fixed time delay after the trigger signal to externally actuated valve assembly 148. If, however, the pyrotechnic material in pyrotechnic gas generator 130 is sufficiently slow to initiate, the trigger signal to initiator 136 may occur simultaneously with, or even before, the trigger signal to externally actuated valve assembly 148, provided that the pressure build up within pyrotechnic gas generator 130 is such that the hot combustion products do not mix with inflation gases 116 until after externally actuated valve assembly 148 has opened.

Burst diaphragm 160 is designed to burst at a predetermined pressure below the maximum operating pressure (MOP) of pressure vessel 114. In the illustrative embodiment, for example, burst diaphragm 160 is designed to rupture at 3000 psi. As shown in FIG. 3, in the illustrative embodiment, depending on the ambient temperature, the initial pressure of inflation gases 116 in pressure vessel 114 can be from 4500 psi at +160° F. (as indicated by the plot having reference numeral 190) to approximately 2500 psi at +70° F. (as indicated by the reference numeral 192) to approximately 1200 psi at −65° F. (as indicated by reference numeral 194).

If the pressure within pressure vessel 114 is below the rupture pressure of burst diaphragm 160 as shown in FIG. 3 reference numerals 192 and 194 (−65° F. and +70° F.), upon the actuation of externally actuated valve assembly 148, inflation gases 116 do not begin to flow into the inflatable device, because burst diaphragm 160 does not rupture. After a fixed time delay, for example from 50 miliseconds to 500 miliseconds, preferably from 100 miliseconds to 250 miliseconds, and most preferably about 100 miliseconds, pyrotechnic gas generator 130 is initiated. At +70° F. (reference numeral 192) initiation of pyrotechnic generator 130 causes a fairly rapid pressure spike up to the 3000 psi burst pressure of burst diaphragm 160. Burst diaphragm 160 then ruptures allowing the heated inflation gases 116 to flow into the inflatable device, while the addition of the hot combustion products from gas generator 130 maintain a relatively level pressure within pressure vessel 114 until the pressure begins to drop off after about three seconds. At −65° F. (reference numeral 194) initiation of pyrotechnic generator 130 causes the pressure in pressure vessel 114 to slowly rise for about 2 seconds to the 3000 psi burst pressure of burst diaphragm 160. During this time, the hot combustion products from pyrotechnic gas generator 130 mix with the cold inflation gases 116 stored in pressure vessel 114. This allows the hot combustion products to transfer heat to the cold inflation gases 116 elevating the temperature thereof. By increasing the temperature of the inflation gases 116, some of the adverse effects of the relatively adiabatic decompression of the inflation gases exiting inflator 100 can be avoided.

At higher temperatures such as at +160° F. (reference numeral 190) the static pressure of inflation gases 116 in pressure vessel 114 already exceeds the 3000 psi burst pressure of burst diaphragm 160. Accordingly, as soon as externally actuated valve assembly 148 is opened, burst diaphragm 160 ruptures and begins the flow of inflation gases to the inflatable device, thereby reducing the static pressure within pressure vessel 114. Initiation of pyrotechnic generator 130 after a fixed time delay causes the pressure in pressure vessel 114 to again increase as the rate of inflow of hot combustion products from gas generator 130 exceeds the rate of outflow of inflation gases through output port 146. This continues until after about 2 seconds the pressure within pressure vessel 114 drops off. It is important to note that because burst diaphragm 160 ruptures immediately allowing the pressure in pressure vessel 114 to drop precipitously prior to initiation to the pyrotechnic gas generator, there is no pressure spike that exceeds the 4500 psi initial pressure in pressure vessel 114. Accordingly, pressure vessel 114 need only be designed to withstand (with the appropriate margin of safety) the 4500 psi static storage pressure of inflation gases 116. But for the combination of downstream burst diaphragm 160 and the fixed time delay between the initiation of externally actuated valve assembly 148 and the initiation of pyrotechnic gas generator 130, pressure vessel 114 would have to be designed to withstand much higher pressures thereby adding substantial weight and cost to the system.

Although certain illustrative embodiments and methods have been disclosed herein, it will be apparent from the foregoing disclosure to those skilled in the art that variations and modifications of such embodiments and methods may be made without departing from the spirit and scope of the invention. Accordingly, it is intended that the invention shall be limited only to the extent required by the appended claims and the rules and principals of applicable law.

What is claimed is:

1. Apparatus for inflating an inflatable device comprising:
a first stage gas source comprising;
    a first stage pressure vessel having a gas exit opening,
    a pressurized cold gas stored within said first stage pressure vessel, and
    an externally actuated valve in fluid communication with said gas exit opening and responsive to an external signal for opening to provide a gas flow path between said first stage pressure vessel and said inflatable device;
a second stage gas source comprising a pyrotechnic gas generator having a gas output directed into said first stage pressure vessel;
an initiator for initiating said second stage gas source such that the gas output of said second stage gas source is directed into said first stage pressure vessel a predetermined period after actuation of said externally actuated valve; and,
a pressure actuated valve having an inlet and an outlet, said pressure actuated valve being interposed in said gas flow path between said first stage pressure vessel and said inflatable device, said pressure actuated valve being operable to open a gas flow path between said externally actuated valve and said inflatable device when a pressure at said inlet of said pressure actuated valve exceeds a predetermined threshold pressure.

2. The apparatus of claim 1, wherein:
said externally actuated valve is electrically actuated.

3. The apparatus of claim 2, wherein:
said externally actuated valve comprises an electroexplosively driven ball valve.

4. The apparatus of claim 2, wherein:
said externally actuated valve comprises a pneumatically operated ball valve.

5. The apparatus of claim 1, wherein:
said externally actuated valve is mechanically actuated.

6. The apparatus of claim 1, wherein:
said pressure actuated valve comprises a rupturable diaphragm being capable of rupturing to define a gas exit opening.

7. The apparatus of claim 1, wherein:
said pressure actuated valve comprises a mechanical pressure relief valve.

8. The apparatus of claim 1, wherein:
said initiator for initiating said second stage gas source comprises a pyrotechnic delay.

9. The apparatus of claim 1, wherein:
said initiator for initiating said second stage gas source comprises an electronic delay circuit having a fixed time delay.

10. The apparatus of claim 1, further comprising:
a pressure regulator interposed in a fluid path between said pressure actuated valve and said inflatable device.

11. A method of inflating an inflatable device comprising:
opening an externally actuated valve to begin a flow of gases from a first stage gas source to a pressure actuated valve interposed in a gas flow path between said externally actuated valve and said inflatable device;
initiating a second stage gas source comprising a pyrotechnic gas generator having a heated gas output;
directing said heated gas output from said second stage gas source into said first stage gas source a predetermined period of time after the step of opening said externally actuated valve such that said heated gas output enters said first stage gas source adding heat and gaseous products to said first stage gas source and thereby raising the gas pressure within said first stage gas source; and
opening a pressure actuated valve interposed in a gas flow path between said externally actuated valve and said inflatable device to establish a flow of gas from said first stage gas source to said inflatable device said pressure actuated valve opening when the gas pressure within said first stage gas source exceeds a predetermined threshold.

12. The method of claim 11, wherein:
said externally actuated valve is electrically actuated.

13. The method of claim 11, wherein:
said externally actuated valve is mechanically actuated.

14. The method of claim 11, wherein:
said pressure actuated valve comprises a rupturable diaphragm being capable of rupturing to define a gas exit opening.

15. The method of claim 11, wherein:
said second stage gas is initiated by a pyrotechnic delay column.

16. The method of claim 11, wherein:
said second stage gas source is initiated by an electronic delay circuit having a fixed time delay.

17. The method of claim 11, further comprising:
regulating a flow of gas exiting said pressure actuated valve to a predetermined pressure by means of a pressure regulator interposed in a fluid path between said pressure actuated valve and said inflatable device.

* * * * *